(12) United States Patent
Hsu

(10) Patent No.: US 6,937,467 B2
(45) Date of Patent: Aug. 30, 2005

(54) DEVICE FOR FASTENING ADAPTER CARDS AT A POSITIONING FRAME OF COMPUTER CASE

(75) Inventor: Cheng-Chung Hsu, Taipei (TW)

(73) Assignee: Inventec Corporation, Taipei (TW)

( * ) Notice: Subject to any disclaimer, the term of this patent is extended or adjusted under 35 U.S.C. 154(b) by 182 days.

(21) Appl. No.: 10/648,339

(22) Filed: Aug. 27, 2003

(65) Prior Publication Data

US 2005/0047080 A1 Mar. 3, 2005

(51) Int. Cl.⁷ .............................. G06F 1/16; H05K 7/14
(52) U.S. Cl. ...................... 361/686; 361/801; 361/796; 361/752; 312/223.2; 211/41.17; 174/35 R; 292/202
(58) Field of Search ................................ 361/683, 684, 361/686, 724–727, 747, 759, 801–804, 752, 796; 211/41, 26, 41.17; 174/35 R, 51; 312/223.1, 223.2; 292/200, 202, 209

(56) References Cited

U.S. PATENT DOCUMENTS

| 5,640,309 | A | * | 6/1997 | Carney et al. | 361/801 |
| 5,673,175 | A | * | 9/1997 | Carney et al. | 361/686 |
| 5,748,453 | A | * | 5/1998 | Carney et al. | 361/801 |
| 5,757,618 | A | * | 5/1998 | Lee | 361/686 |
| 5,831,821 | A | * | 11/1998 | Scholder et al. | 361/686 |
| 6,114,622 | A | * | 9/2000 | Draeger | 174/35 R |
| 6,215,668 | B1 | * | 4/2001 | Hass et al. | 361/759 |
| 6,608,765 | B2 | * | 8/2003 | Vier et al. | 361/801 |
| 6,674,650 | B1 | * | 1/2004 | Davis et al. | 361/796 |
| 6,700,791 | B1 | * | 3/2004 | Zappacosta | 361/759 |
| 2002/0075638 | A1 | * | 6/2002 | Chen | 361/683 |
| 2003/0001467 | A1 | * | 1/2003 | Shyr | 312/223.2 |
| 2003/0038095 | A1 | * | 2/2003 | Kuo et al. | 211/41.17 |
| 2004/0037048 | A1 | * | 2/2004 | Liao | 361/726 |

* cited by examiner

Primary Examiner—Lisa Lea-Edmonds
(74) Attorney, Agent, or Firm—Bacon & Thomas PLLC

(57) ABSTRACT

The present invention is to provide a device for fastening adapter cards on a frame of a computer case, which comprises an IO port positioning frame on a panel of the case having a first slot at one end and a second slot at an the other end, and a fastening assembly having a first snapping element at one end, a second snapping element at the other end, and a plurality of equally spaced apart fastening elements along one side of a longitudinal part of the fastening assembly between the first and the second snapping elements. Whereby snapping the fastening assembly onto the frame will fasten the adapter cards at the frame easily and quickly.

7 Claims, 3 Drawing Sheets

DEVICE FOR FASTENING ADAPTER CARDS AT A POSITIONING FRAME OF COMPUTER CASE

FIELD OF THE INVENTION

The present invention relates to fastening devices of adapter cards and more particularly to an improved device for fastening adapter cards at a positioning frame of computer case by snapping.

BACKGROUND OF THE INVENTION

In response to all kinds of new information products being developed, especially the wide popularity of personal computers, more and more users become more critical with respect to the convenience in using them. For increasing data transfer speed of peripherals, a PCI (Peripheral Component Interconnect) has been developed by Intel Corp. PCI has become the widely used bus in its respective market. This means that other low speed buses (e.g., ISA (Industry Standard Architecture), etc.) are replaced gradually by PCI in the computer market.

Currently, a PCI adapter card is mounted on a motherboard of computer. In short, PCI adapter cards are dominant in the market. For a typical ATX type motherboard, five (5) or more expansion slots for PCI are provided thereon. Conventionally, the higher the number of expansion slots on the motherboard the more powerful of the expansion capability of computer. In this regard, all major computer and/or electronics companies continuously make efforts to develop and/or improve expansion slots and adapter cards in order to meet consumer demand. To the contrary, arrangements for fastening the adapter cards at a computer case are rarely improved.

A conventional arrangement of fastening adapter cards 20 at a computer case 10 is shown in FIG. 1. As illustrated, an input/output (IO) port positioning frame 11 is provided on a rear panel of the case 10. The frame 11 comprises a plurality of elongate, parallel openings 12 corresponding to a plurality of expansion slots 13 on a motherboard inside the case 10, and a plurality of holes 14 each between two adjacent openings 12. Also, each of the adapter cards 20 is adapted to insert into a corresponding expansion slot 13. The rectangular adapter card 20 comprises a connector (not shown) at one side and a metal bracket 21 at one end. One end of the bracket 21 is bent about 90 degrees to form a connecting piece 22 having an indentation 23. In assembly, insert the connector of the adapter card 20 into the expansion slot 13 with the bracket 21 of the adapter card 20 rested on and covered a corresponding opening 12. Also, the connecting piece 22 is urged against a side of the frame 11. As to the opening 12 corresponding to the expansion slot 13 without insertion of the adapter card 20, a metal plate 40 can be placed thereon for covering. One end of the plate 40 is also bent about 90 degrees to form a connecting piece 41 having an indentation 42. By configuring as above, a screw 50 can be driven through the indentations 23 and 42 and the hole 14 to fasten the adapter card 20 or the plate 40 on the opening 12 of the frame 11.

However, the prior technique of fastening the adapter card 20 by means of the screw 50 has disadvantages of being time consuming and being tedious in assembly and use, and inconvenience in operation. Thus, it is understood that if no effective fastening means is provided more inconvenience and trouble may be brought to users in replacing a malfunctioned adapter card 20 or installing a new one in the expansion slot. Consequently, users may complaint more about fastening adapter cards 20 during installation. This can discourage users to buy new adapter cards 20. As a result, adapter card 20 market will be hardly hit. In another point of view, for keeping up with the needs of the vast computer assembly market computer manufacturing companies not only have to maintain product quality but also have to increase the assembly speed in which an increase of assembly speed in the assembly line, particularly a fastening of adapter cards 20, plays an important role in increasing computer assembly speed. Thus, the need for improvement still exists.

SUMMARY OF THE INVENTION

A primary object of the present invention is to provide a device for fastening adapter cards on a frame of a computer case. The device comprises an IO port positioning frame on a panel of the case, the frame comprising a first slot at one end and a second slot at an the other end, and a fastening assembly comprising a first snapping element at one end, a second snapping element at the other end, and a plurality of equally spaced apart fastening elements along one side of a longitudinal part of the fastening assembly between the first and the second snapping elements. Whereby snapping the fastening assembly onto the frame will fasten the adapter cards at the frame. By utilizing the present invention, the above drawbacks of the prior art can be overcome. These drawbacks are that the threadedly securing is time consuming and tedious in assembly and use, it is inconvenient in operation, and it is not ergonomic. Moreover, the present invention has advantages of simple construction, precise sizes of respective components, simultaneous fastening of adapter cards or plates, significant improvements about manufacturing cost, assembly, and disassembly as compared with the prior art, and being ergonomic.

The above and other objects, features and advantages of the present invention will become apparent from the following detailed description taken with the accompanying drawings.

DETAILED DESCRIPTION OF THE PREFERRED EMBODIMENTS

Figure 1:
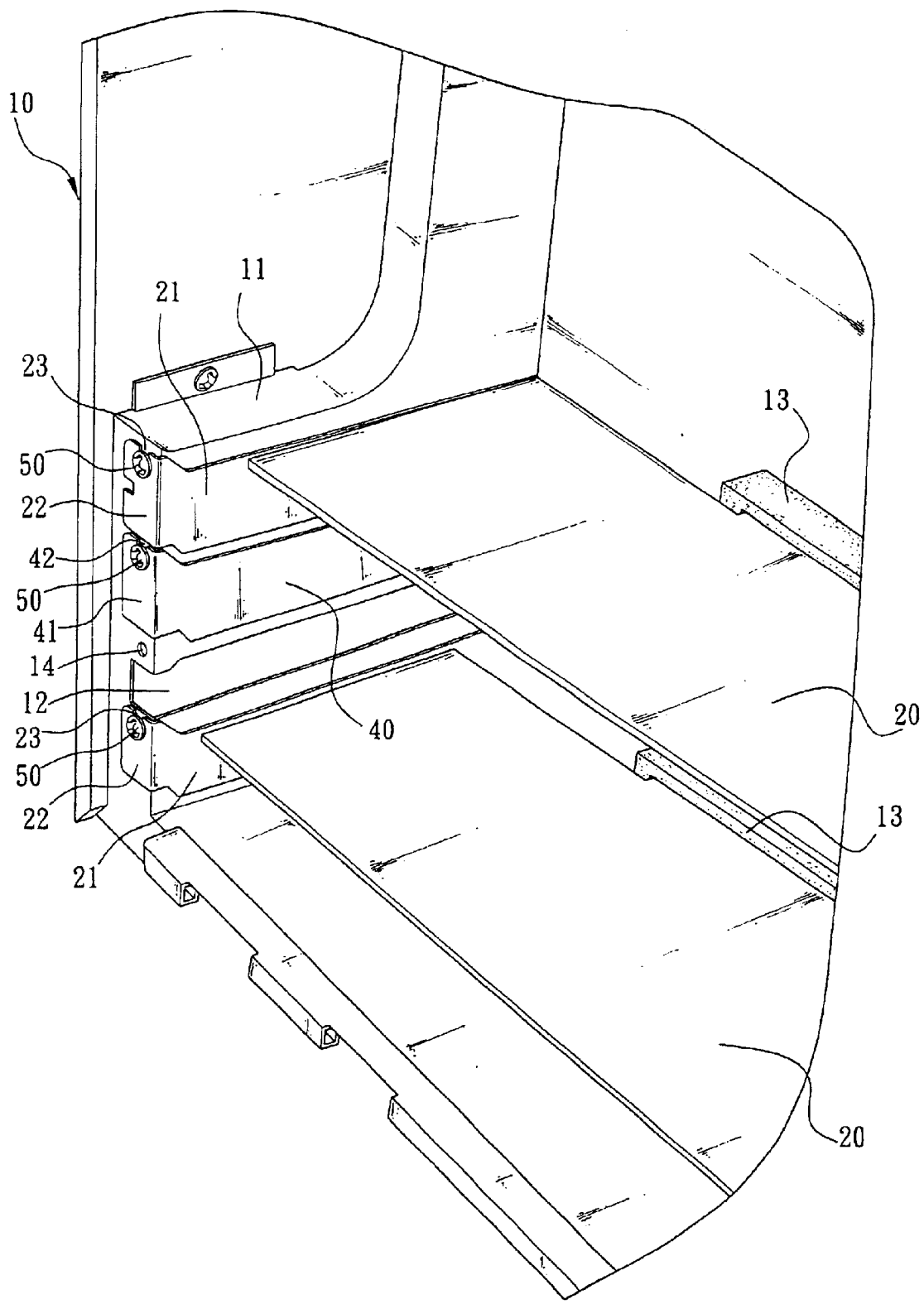
FIG. 1 is a perspective view of a conventional arrangement of fastening adapter cards at a positioning frame of computer case.
Figure 2:
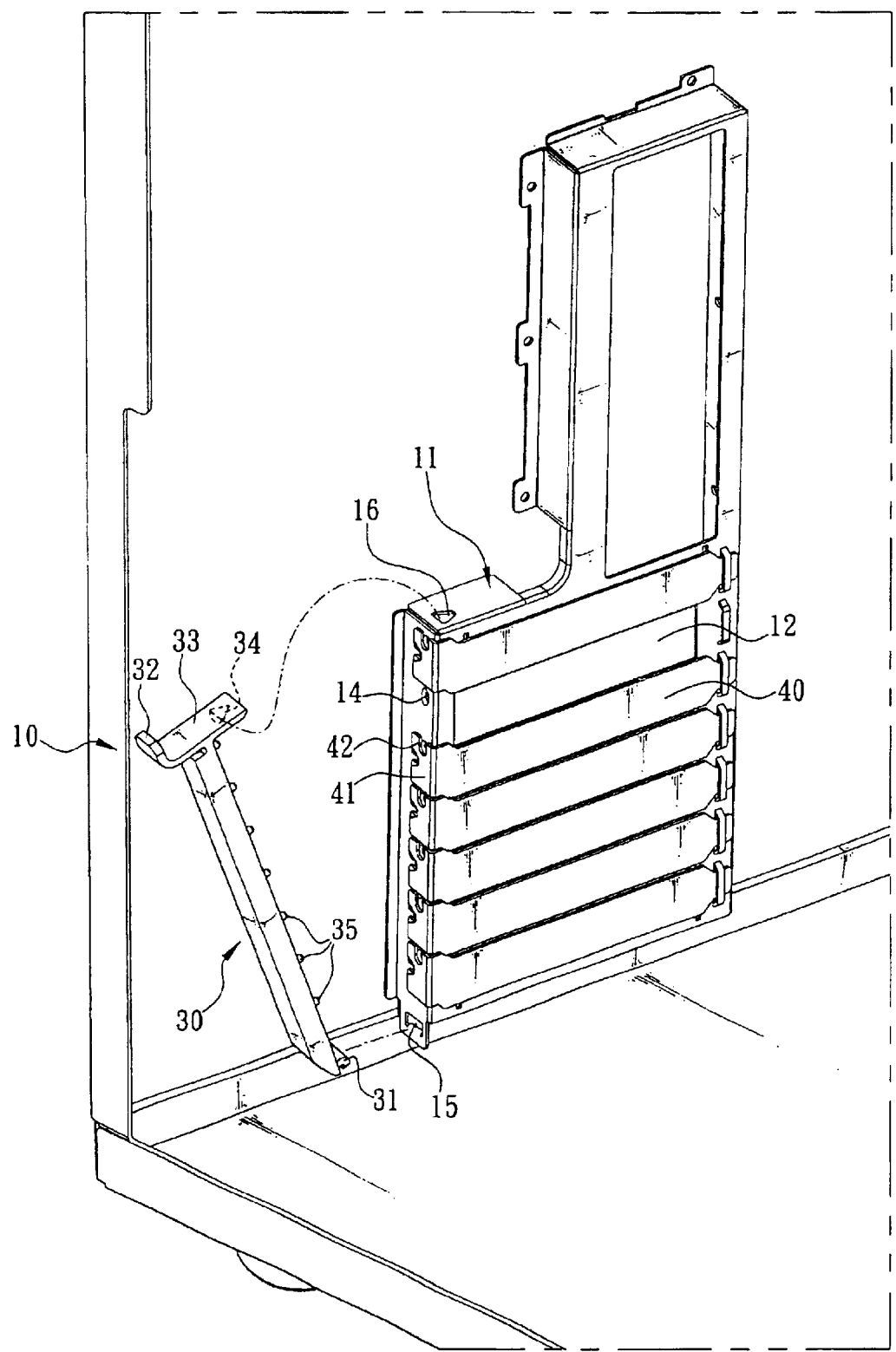
FIG. 2 is a perspective view of a preferred embodiment of device for fastening adapter cards at a positioning frame of computer case according to the invention where the fastening assembly is in a nonoperating position.
Figure 3:
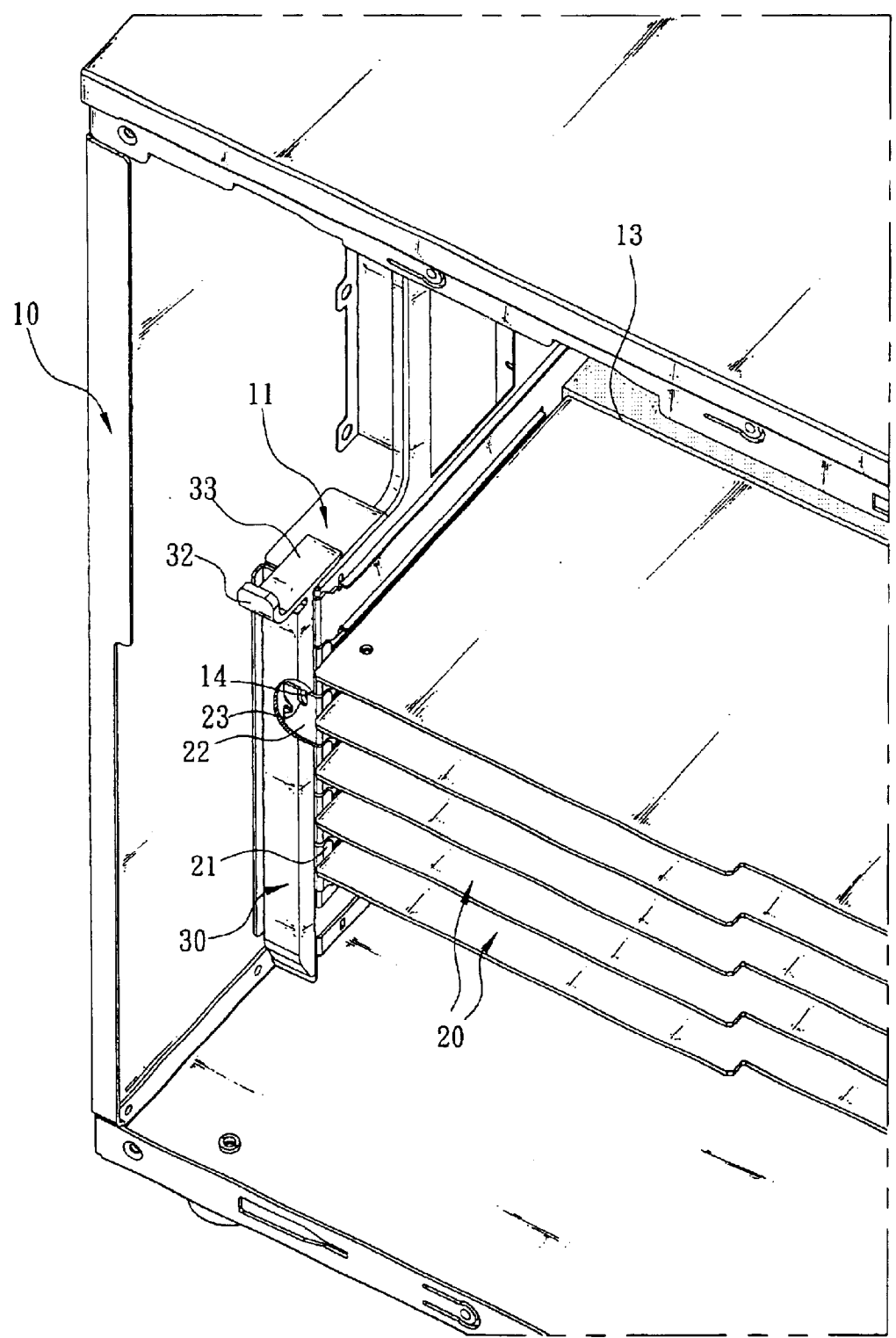
FIG. 3 is a perspective view of the fastening assembly in an operating position for fastening adapter cards.

Referring to FIGS. 2 and 3, there is shown a device for fastening adapter cards at a positioning frame of computer case in accordance with the invention. The invention comprises an IO port positioning frame 11 and a fastening assembly 30. The frame 11 is provided on a rear panel of a computer case 10. The frame 11 comprises a plurality of elongate, parallel openings 12 corresponding to a plurality of expansion slots 13 on a motherboard inside the case 10, a plurality of holes 14 each between two adjacent openings 12, a first slot 15 at a lower end, and a second slot 16 at an upper end which is bent about 90 degrees about a longitudinal part of the frame 11 (see FIG. 2). A fixing member can be mounted on the opening 12 of the frame 11. The fixing member may be a metal bracket 21 at one end of an adapter card 20 (see FIG. 3) or a metal plate 40 (see FIG. 2). The constructions of both the adapter card 20 and the plate 40 are the same as that of prior ones. In a case of mounting the fixing member (e.g., the adapter card 20) on the opening 12, a connecting piece 22, formed at one end of the bracket 21 by bending about 90 degrees about the bracket 21, is urged against a side of the frame 11. The bracket 21 comprises an indentation 23 (see FIG. 3). In another case of mounting the fixing member (e.g., the plate 40) on the opening 12, a connecting piece 41 (see FIG. 2), formed at one end of the plate 40 by bending about 90 degrees about the plate 40, is urged against the side of the frame 11. The connecting piece 41 comprises an indentation 42.

In the invention the fastening assembly 30 is adapted to snap onto the frame 11 (see FIG. 3). The fastening assembly 30 is a substantially T-shaped plate member. The fastening assembly 30 comprises a first snapping element (e.g., first hook) 31 at a lower end and a transverse handle 32 (see FIG. 2) at an upper end. The handle 32 has a slightly, upwardly bent end for facilitating the applying of a pivotal force to the fastening assembly 30, and a snapping section 33 at the other end. A second snapping element (e.g., second hook) 34 is formed on the snapping section 33. The second snapping element 34 is opposite to the first snapping element 31. A plurality of equally spaced apart fastening elements (e.g., pins) 35 are provided along one side of a longitudinal part of the fastening assembly 30, i.e., between the first snapping element 31 and the snapping section 33 (see FIG. 2). In a case of snapping the fastening assembly 30 onto one side of the frame 11, some fastening elements 35 are inserted through the indentations 23 on the connecting pieces 22 of the adapter cards 20 (see FIG. 3) into the corresponding holes 14 on one side of the frame 11 for fastening (see FIG. 2). Also, the remaining fastening elements 35 are inserted through the indentations 42 on the connecting pieces 41 of the plate 40 (see FIG. 2) into the corresponding holes 14 on one side of the frame 11 for fastening.

By configuring as above, as shown in FIG. 3 it is seen that responsive to inserting the connector of the adapter card 20 into the expansion slot 13 with the bracket 21 of the adapter card 20 rested on and covered a corresponding opening 12, the connecting piece 22 is urged against one side of the frame 11. Next, snap the first snapping element 31 at the lower end of the fastening assembly 30 into a first slot 15 at the lower end of the frame 11 so that the fastening assembly 30 is adapted to pivot about the first snapping element 31 to cling to one side of the frame 11 with, as stated above, some fastening elements 35 inserted through the indentations 23 on the connecting pieces 22 into the corresponding holes 14 on one side of the frame 11 for fastening. Also, the second snapping element 34 at one end of the snapping section 33 of the fastening assembly 30 is snapped into the second slot 16 at the upper end which, as stated above, is bent about 90 degrees about the longitudinal part of the frame 11. As an end, the adapter cards 20 are fastened.

To the contrary, in disengaging the fastening assembly 30 from the frame 11 with the adapter cards 20 mounted thereat following steps are performed. First pull the handle 32 of the fastening assembly 30 to cause the second snapping element 34 to clear from the second slot 16. Immediately next, pivot the first snapping element 31 of the fastening assembly 30 counterclockwise about the first slot 15 of the frame 11. As an end, the adapter cards 20 are unfastened.

In view of the above, the fastening assembly 30 of the invention has advantages of simple construction, precise sizes of respective components, simultaneous fastening of the adapter cards 20 or the plates 40, significant improvements about manufacturing cost, assembly, and disassembly as compared with the prior art, and being ergonomic.

While the invention has been described by means of specific embodiments, numerous modifications and variations could be made thereto by those skilled in the art without departing from the scope and spirit of the invention set forth in the claims.

What is claimed is:

1. A device for fastening adapter cards on a frame of a computer case, comprising:

an IO port positioning frame on a panel of the case, the frame comprising a plurality of elongate, parallel openings corresponding to a plurality of expansion slots on a motherboard inside the case, a plurality of holes each between two adjacent openings, a first slot at one end, and a second slot at an the other end which is perpendicular about a longitudinal part of the frame so that a plurality of fixing members each comprising a connecting piece having an indentation can be mounted on the openings of the frame for covering with the connecting pieces urged against one side of the frame; and a fastening assembly adapted to snap onto the frame, the fastening assembly being formed of a substantially T-shaped plate and comprising a first snapping element at one end and a transverse handle at the other end, the handle comprising a snapping section at the other end thereof, the snapping section comprising a second snapping element opposite to the first snapping element, and a plurality of equally spaced apart fastening elements along one side of a longitudinal part of the fastening assembly between the first snapping element and the snapping section, whereby snapping the first snapping element at one end of the fastening assembly into the first slot at one end of the frame will cause the fastening elements to insert through the indentations on the connecting pieces of the fixing members on the frame into the corresponding holes on one side of the frame for fastening and will cause the second snapping element at one end of the snapping section of the fastening assembly to snap into the second slot at the other end, thereby fastening the adapter cards at the frame.

2. The device of claim 1, wherein one end of the handle is bent upwardly slightly.

3. The device of claim 1, wherein the first snapping element is a first hook.

4. The device of claim 1, wherein the second snapping element is a second hook.

5. The device of claim 1, wherein each of the fastening elements is a pin.

6. The device of claim 1, wherein each of the fixing members is an adapter card having a metal bracket at one end and a connecting piece at one end of the metal bracket, the connecting piece being perpendicular about the bracket.

7. The device of claim 1, wherein each of the fixing members is a metal plate having a connecting piece perpendicular at one end, the connecting piece being perpendicular about the metal plate.

* * * * *